United States Patent [19]

Umeda

[11] 4,173,319
[45] Nov. 6, 1979

[54] MAGNETIC TAPE CASSETTE

[75] Inventor: Hiroyuki Umeda, Yokohama, Japan

[73] Assignee: Victor Company of Japan, Limited, Yokohama, Japan

[21] Appl. No.: 877,956

[22] Filed: Feb. 15, 1978

Related U.S. Application Data

[62] Division of Ser. No. 750,220, Dec. 13, 1976, Pat. No. 4,091,426.

[30] Foreign Application Priority Data

Dec. 13, 1975 [JP] Japan ................. 50-168236
Jun. 11, 1976 [JP] Japan ................. 51-74969

[51] Int. Cl.² ........................................... G11B 15/32
[52] U.S. Cl. ................................. 242/199; 360/132
[58] Field of Search ........................ 242/197–199, 242/186, 188, 200–204; 360/74, 132, 92, 93, 96

[56] References Cited

U.S. PATENT DOCUMENTS

| | | | |
|---|---|---|---|
| 3,288,385 | 11/1966 | Markakis et al. | 242/188 |
| 3,615,155 | 10/1971 | Gelbman | 242/188 |
| 3,980,255 | 9/1976 | Serizawa | 242/198 |

Primary Examiner—Leonard D. Christian

[57] ABSTRACT

A magnetic tape cassette is designed for use in a magnetic recording and/or reproducing apparatus. The ends of the magnetic tape within the cassette are detected by a combination of a single light-emitting source and first and second light-receiving photocells mounted on the apparatus and disposed opposite each other. The magnetic tape is opaque and has first and second transparent leader tapes connected to its opposite ends. The cassette case receives and accommodates first and second reels with the tape extending therebetween and across the face of the cassette case. The cassette face extends between first and second side or end walls which have first and second windows formed therein. The bottom of the cassette has a hole for receiving the light-emitting source at a point where the light will pass through both windows if the opaque tape does not bar the way. A lid is pivotally mounted on the side or end walls to swing to either a closed position where the lid covers both the front face and the first and second windows, or an opened position where the lid exposes both the front face and the first and second windows. The first window is formed at a position where the light passes from the light-emitting source through the leader tape to the first light-receiving photocell when the lid is in the opened position. The second window is formed at a position where the light passes from the light-emitting source through the second leader tape to the second light-receiving photocell when the lid is in the opened position.

8 Claims, 6 Drawing Figures

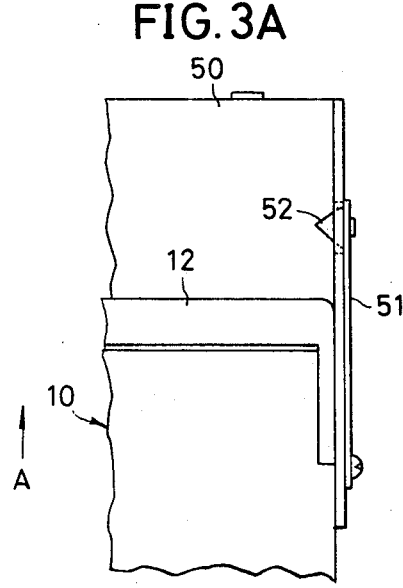
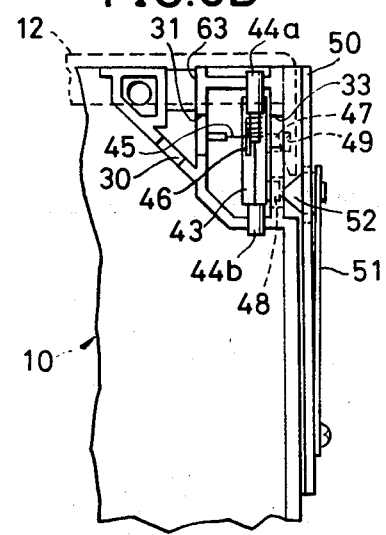

MAGNETIC TAPE CASSETTE

BACKGROUND OF THE INVENTION

This is a divisional application of the U.S. patent application Ser. No. 750,220, entitled "DEVICE FOR DETECTING AN END OF A CASSETTE TAPE", now U.S. Pat. No. 4,091,426, issued May 23, 1978.

The present invention relates generally to magnetic tape cassettes, and more particularly to a magnetic tape cassette adapted to be used in a magnetic recording and/or reproducing apparatus. Detecting means are built into the cassette for detecting the ends of a magnetic tape in the cassette, when the tape has been entirely wound on either a takeup reel or a supply reel, and it cannot travel further.

There have been tape-end detection devices for detecting the completely wound state of a magnetic tape. In a magnetic tape cassette adapted to be used in the tape-end detection device known heretofore, hubs of the tape reels are formed from a transparent material and adapted to hold a photocell. The tape end detection depends upon whether or not these photocells receive light transmitted from a lamp positioned within the cassette. However, the construction of the reels and cassette become complicated, since the photocells are mounted on the side of the recording and/or reproducing apparatus and they must be fitted into the cassette, together with means for driving the reels. Moreover, since light must be detected after it has been transmitted through a relatively thick reel hub, the tape end detection is inaccurate and unreliable.

In another known tape-end detection device, a photocell is disposed outside of the reel in a magnetic tape cassette. The light from a lamp is shut off from this photocell by the magnetic tape roll wound up on the hub of the reel. When the magnetic tape has been completely unwound and paid out, the light from the lamp reaches the photocell. However, since the magnetic tape is very thin, it is difficult to positively detect whether or not the magnetic tape has been wound around the hub of the reel.

Furthermore, the magnetic tape cassette used in this known detection device has openings or windows in the vicinity of the central part of its side walls for permitting light from a lamp to reach a photocell. These windows are always open, even when the cassette is not being used, and the magnetic tape within the cassette is exposed through these windows to the outside. This is a disadvantageous feature since dust can readily enter into the cassette through these windows and adhere to the magnetic tape. An adhesion of dust on the magnetic tape gives rise loss of signal at the time of recording and reproducing. This loss leads to a serious condition wherein good recording and reproducing cannot be accomplished.

In addition, there are cases wherein these windows become clogged by dust, grime, or other foreign matter. In other instances, labels with the recorded contents of the cassettes printed or written thereon have sometimes been stuck on the side walls of the cassette cases, thereby closing the windows, either because of carelessness of the users or because users, in general, do not fully understand the construction of the cassette. In such a case, the passage of the light from the lamp is obstructed. This gives rise to a serious disadvantage in that tape-end detection becomes impossible.

Still another known tape-end detection device is called a compact type cassette. An audio signal is recorded on or reproduced from a magnetic tape while it is accommodated within the cassette. Light from a light-emitting means is inserted into the cassette so that it passes through a transparent leader tape fixed to the tape end. When the tape end is reached, the light is projected onto light-receiving means located on the outside of the front face of the cassette in a position to confront the light-emitting means.

This magnetic tape cassette, however, is adapted to record and reproduce only an audio signal with the magnetic tape always contained within the cassette. For this reason, this magnetic tape cassette cannot be used in an apparatus for recording and/or reproducing a video signal where the tape must be drawn out through the front face of the cassette and passed in a wrapping contact around a guide drum having rotating heads therein. The reason for this is that, in an apparatus of this character for recording/reproducing video signals, the means for drawing out the magnetic tape must pass through the front face of the cassette. For this reason if a light-receiving means were to confront the cassette front face, this light-receiving means would interfere with the operation of the tape drawing out means. Furthermore, it is necessary to provide a pair of light-emitting means respectively in separate positions to confront a pair of light-receiving means, and the construction becomes complicated.

SUMMARY OF THE INVENTION

Accordingly, it is a general object of the present invention to provide a novel and useful magnetic tape cassette adapted to be used in a recording and/or reproducing apparatus having a device for detecting the ends of a magnetic tape, which cassette overcomes the above described difficulties.

Another and specific object of the invention is to provide a magnetic tape cassette adapted to be used in a recording and/or reproducing apparatus having a device for detecting the ends of a magnetic tape responsive to light transmitted through transparent leader tapes. The magnetic tape cassette has a case with windows in the side walls thereof and a lid hinged on the side walls. When closed, the lid covers the magnetic tape where it is exposed on the front face of the cassette case and at the windows in the side walls. Since the windows in the side walls are closed by a lid when the cassette is not being used, there is no infiltration of dust and other foreign matter through the windows and into the cassette interior. Therefore, dust does not adhere to the magnetic tape to cause a loss of signal at the time of recording and reproducing. Other undesirable effects such as a generation of noise or deterioration of image quality do not occur. Furthermore, clogging or shutting of the windows by other objects is also prevented. A positive detection of the tape end can always be accomplished.

Still another object of the invention is to provide a magnetic tape cassette which is suitable for use in conjunction with the above mentioned detection device. The positions and configurations (such as the hole for accommodating the light-emitting means and the windows for passing light) are optimally selected. As a whole, the cassette has been miniaturized.

Further objects and features of the invention will become apparent from the following detailed description with respect to preferred embodiments of the invention when read in conjunction with the accompanying drawings, briefly described below.

BRIEF DESCRIPTION OF THE DRAWINGS

In the drawings:

FIGS. 3A and 3B are fragmentary plan views respectively showing the manner in which the cover of the magnetic tape cassette is locked and unlocked.

DETAILED DESCRIPTION

Figure 1:
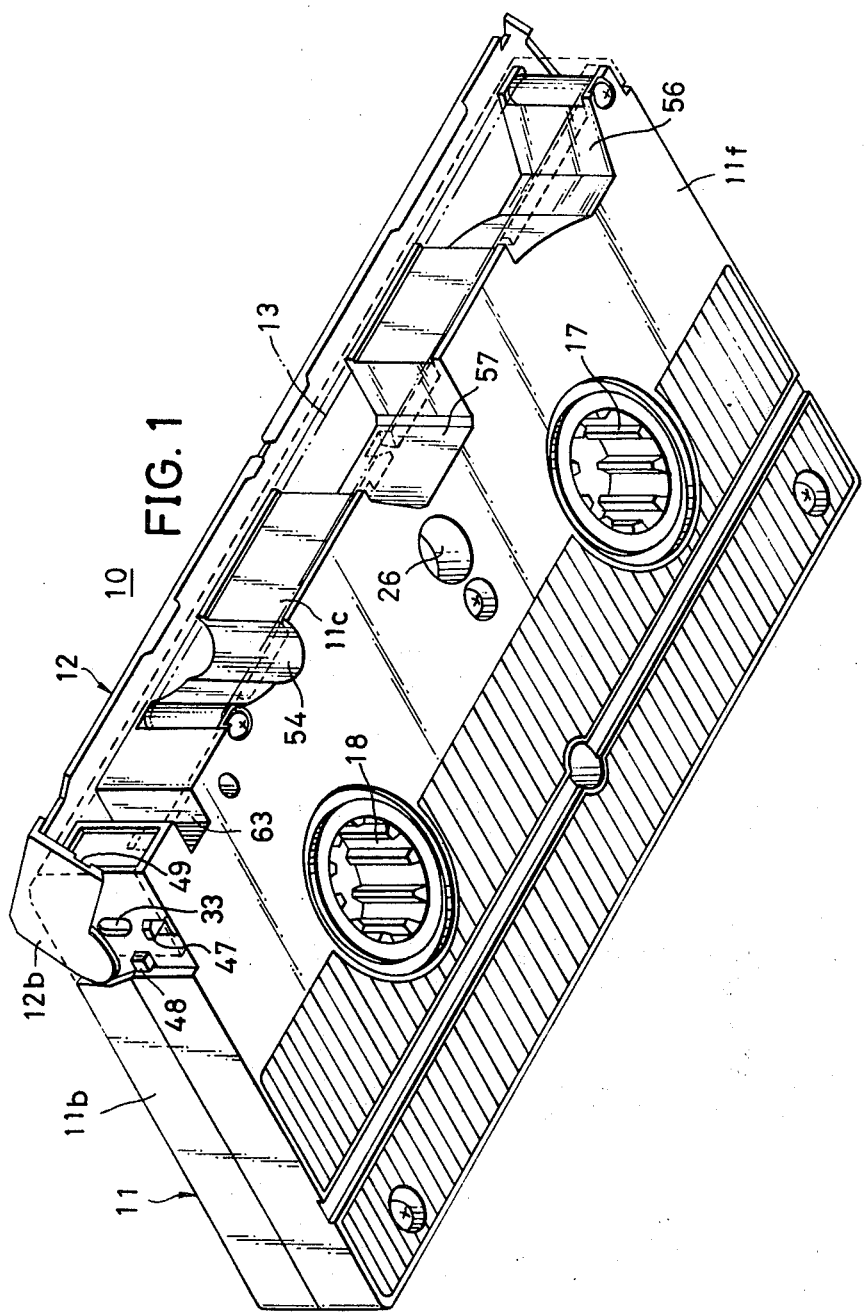
FIG. 1 is a perspective view of the bottom of one embodiment of a magnetic tape cassette according to the present invention.
Figure 2:
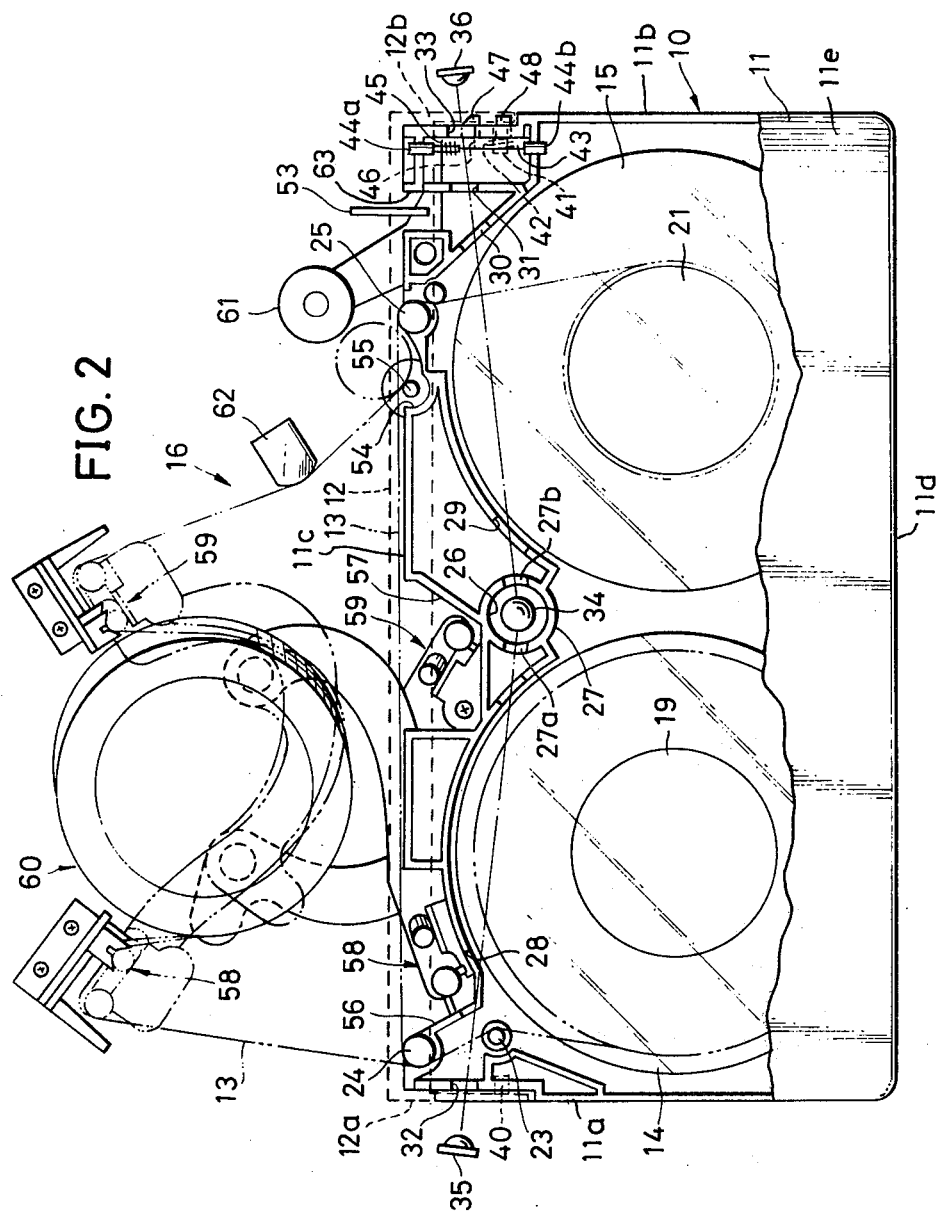
FIG. 2 is a plan view of the magnetic tape cassette illustrated in FIG. 1, which is shown with a part cut away, in a state wherein it has been loaded into a magnetic tape recording and/or reproducing apparatus having a tape-end detection device.

One embodiment of a magnetic tape cassette of the present invention cooperates with a device for detecting an end of a magnetic tape, as shown in FIGS. 1 and 2. The magnetic tape cassette 10 has an outer housing structure comprising a cassette case 11 and a lid 12. The lid 12 is freely openable and closable on the front face of the case 11. The cassette case 11 has side walls 11a and 11b and spaced apart front and rear face parts 11c and 11d respectively terminated at opposite ends thereof by the side walls. The upper and bottom parts 11e and 11f cover the upper and lower portions of a space enclosed within and by the side walls and the front and rear face parts. The cassette case 11 accommodates therewithin, a freely rotatable tape supply reel 14 and a tape takeup reel 15, each for winding an opaque magnetic tape 13. These reels are positioned side by side between the side walls. The bottom part 11f of the cassette case 11 has two shaft holes 17 and 18 for receiving reel drive spindles or shafts on the recording and/or reproducing apparatus 16. These shafts fit into the hubs of the respective reels 14 and 15 when the cassette 10 is inserted into its loaded position in the recording and/or reproducing apparatus.

Figure 4A:
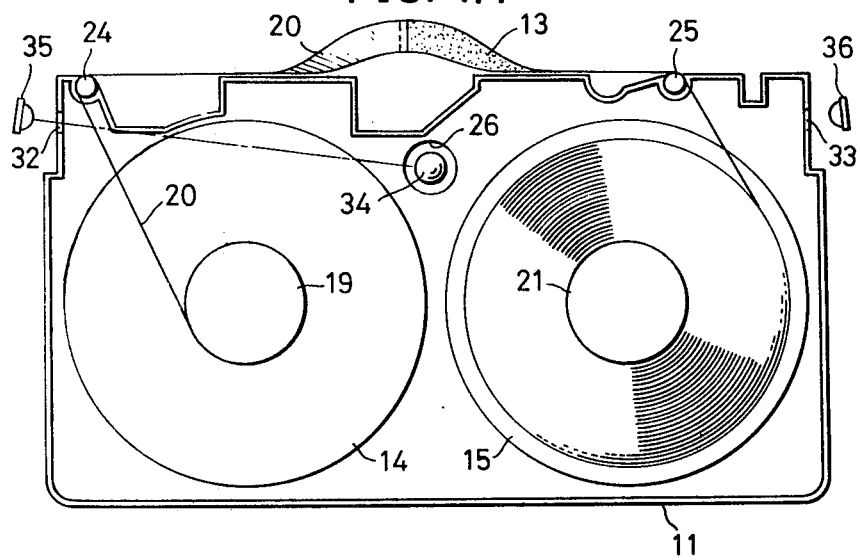
FIGS. 4A and 4B are plan views of the magnetic tape cassette, with the upper half of its case removed, respectively showing the magnetic tape end upon completion of the fastforward and rewind modes of operation.
Figure 4B:
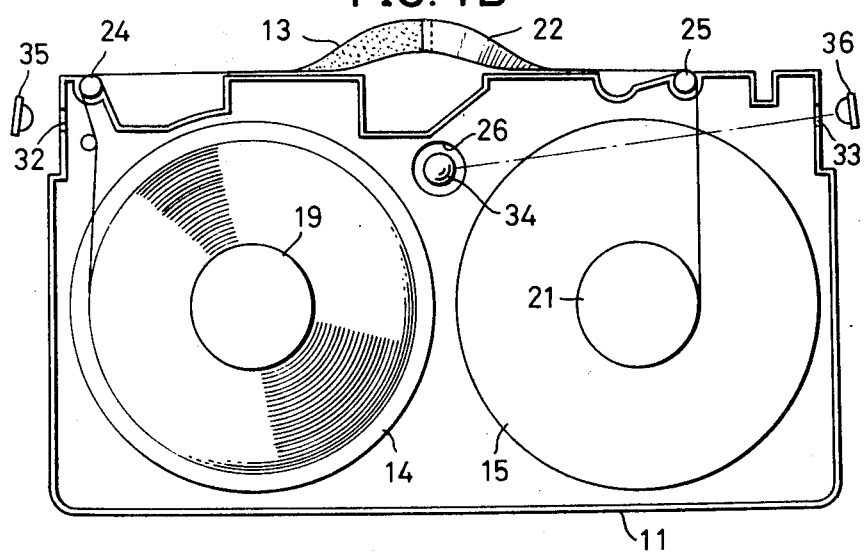

As shown in FIGS. 4A and 4B, one end of the magnetic tape 13 is connected to the outer end of a transparent leader tape 20 which is fixed at its inner end to a hub 19 of the supply reel 14. The other end of the magnetic tape 13 is connected to the outer end of a transparent leader tape 22 which is fixed at its inner end to a hub 21 of the takeup reel 15. The magnetic tape 13 is guided by guide poles 23, 24, and 25, from the supply reel 14 to the takeup reel 15 during normal recording, reproducing, or fast-forwarding mode operations, and from the takeup reel 15 to the supply reel 14 during the rewinding mode of operation.

Within the cassette case 11, a hole 26 is formed in the bottom part 11F for receiving a lamp at a substantially intermediate position between the two reels 14 and 15 and near the front face side of the case. This position is advantageous in that it is in a relatively clear and ample space within the cassette case. For this reason, it is not necessary to provide additional space especially for the lamp fitting hole 26. The cassette case need not be made larger merely for this purpose. This lamp fitting hole 26 is defined and bordered by a cylindrical wall 27, in which openings 27a and 27b are formed. Furthermore, at specific positions of wall structures within the case 11, cutouts or openings 28, 29, 30, and 31 are formed.

Windows 32 and 33 are respectively provided in the side walls 11a and 11b of the cassette case 11 at positions near the front face, that is, at the front parts of the side walls where they are adjacent the front face.

The openings 27a and 27b are at positions where straight lines joining the space (chamber) within the cylindrical wall 27 and the windows 32 and 33, respectively, intersect the cylindrical wall 27. The configurations of the cassette interior are designed so that the straight lines (i.e., the light paths they represent) do not touch or intersect the hubs 19 and 21 of the reels 14 and 15. A light-emitting element described hereinafter is fitted into the interior space of the cylindrical wall 27. The light emitted by this light-emitting element is directed toward the windows 32 and 33 only after passing through the openings 27a and 27b in the cylindrical wall 27. There is no emission of light in unnecessary directions. Therefore, there is no possibility of light scattering and being reflected through the window, without being blocked by the magnetic tape, to cause an erroneous tape end detection.

In the recording and/or reproducing apparatus 16, a light-emitting element, e.g., a lamp 34, fits into the hole 26 when the magnetic tape cassette 10 is inserted into its loading position. In the recording and/or reproducing apparatus 16, a light receiving element, e.g., a photocell 35, is positioned to receive light emitted by the lamp 34 after it passes through the openings 27a and 28 and the window 32. In addition, a photocell 36 receives the light emitted by the lamp 34 which passes through the openings 27b, 29, 30, and 31 and the window 33.

The lid 12 comprises a main lid structure of plate form facing the front face part of the cassette case 11. Side flanges or parts 12a and 12b are formed integrally with this main lid structure, which is bent to form the flanges at its opposite ends. The lid 12 is pivotally supported at its side parts 12a and 12b by hinge pins 40 and 41 formed on the side walls of the cassette case 11 near the front face part. A torsion spring 42 continually urges the lid 12 to swing around the pivot pin 41 toward a closed position. When the magnetic tape cassette 10 is not loaded in the apparatus 16, the lid 12 is closed as, indicated by broken lines in FIG. 1, to cover the magnetic tape 13 which is exposed at the front face of the cassette case 11. When the lid 12 is closed, the windows 32 and 33 are covered by the side parts 12a and 12b of the lid 12, to prevent infiltration of dust into the cassette case and an adherence of dust to the magnetic tape. Furthermore, there is almost no possibility of accidental or careless closure of the windows 32 and 33 by dust, grime or labels.

Here, the windows 32 and 33 are provided in the side walls of the cassette case 11 near the front face part thereof. Since the side parts 12a and 12b of the lid 12 merely need to be of a size which is sufficient to cover the windows 32 and 33 when the lid 12 is closed, the lid 12 can be made small.

Within the case 11, a lock plate 43 is rotatably supported by pivot pins 44a and 44b are urged by a torsion spring 45 to press against the inner surface of the case side wall. The lock plate 43 has an opening 46. Projections 47 and 48 on the side surface of the lock plate 43 project through openings in the side wall of the case. The projection 47 engages a recess 49 in the side part 12b of the lid 12, when it is closed, thereby locking the lid 12 against opening. The projection 48 is disposed within a groove formed between the side part 12b of the lid 12 and the outermost surface of the case 11 when the lid 12 is closed.

The magnetic tape cassette 10, with its lid 12 closed, is inserted horizontally in the arrow direction A onto and along a loading platform 50 of the recording and/or reproducing apparatus 16, as indicated in FIG. 3A. A leaf spring 51 has a projection 52 at its free end and is fixed at its root end to the side of the loading platform 50. As the magnetic tape cassette 10 is inserted, the projection 52 slides along the side part 12b of the lid 12. When the magnetic tape cassette 10 is fully inserted as shown in FIG. 3B, the projection 52 fits into a groove between the side part 12b of the lid 12 and the outermost surface of the case 11. Projection 52 presses the projection 48 toward the left as viewed in the same figure. As a consequence, the lock plate 43 rotates, overcoming the force of the spring 45. The projection 47 is also displaced leftward and is disengaged from the recess 49 of the side part 12b of the lid 12, thereby unlocking the lid 12. When the loading platform 50 is thereafter lowered, a lug 53 fits into a groove part 63 for opening the lid. Lug 53 is fixed on the recording/reproducing apparatus. The groove 63 extends vertically from the lower surface of the cassette at a position near the side wall 11b, and is located in the front face part of the cassette case 11. The lug 53 abuts against the lower edge of the lid 12. With the downward movement of the cassette 10, the lid 12 engages the lug 53 and opens against the force of the spring 42, as indicated by the full lines in FIG. 1. Consequently, the front of the magnetic tape 13 is revealed, and the windows 32 and 33 open.

On the downward movement of the cassette 10, the lamp 34 is fitted into the hole 26, and the reel drive shafts (not shown) are fitted into shaft holes 17 and 18. At the same time, a capstan 55 fits into a recess 54 on the front side and lower side of the case 11. Magnetic tape drawing out and loading members 58 and 59 fit into recesses 56 and 57.

When the recording and/or reproducing apparatus 16 is placed in the recording or reproducing mode of operation, the upper drum of a guide drum 60, having video heads, begins to rotate. At the same time, the magnetic tape drawing out and loading members 58 and 59 move to the positions indicated by broken lines. The magnetic tape 13 wraps around part of the guide drum 60. A pinch roller 61 presses the magnetic tape 13 against the capstan 55.

The magnetic tape 13 thus clamped by the capstan 55 and the pinch roller 61 is driven by the rotation thereof. The tape on the supply reel 14 is unwound and paid out to be wound up on the takeup reel 15. At the same time, video signals are recorded on or reproduced from the magnetic tape 13 by the video heads of the guide drum 60. An audio signal is recorded or reproduced by an audio head 62.

During the recording or reproducing operation, the light from the lamp 34 is shut off by the magnetic tape 13 paid out or supplied from the supply reel 14 and wound or taken up by the takeup reel 15. Thus, light does not reach the photocells 35 and 36.

When the magnetic tape 13 has been completely paid out from the supply reel 14, and the recording or reproducing has been completed, the transparent leader tape 20 is paid out into the tape travel path between the reel hub 19 and the guide pole 24. Consequently, the light from the lamp 34, which until now has been shut off by the opaque magnetic tape 13, passes through the leader tape 20 and the window 32, reaching the photocell 35. This reception of the light by the photocell 35 signals a detection of the end of the tape. The resulting output detection signal of the photocell 35 stops the recording or reproducing operation.

The fast forwarding mode operation is carried out with the tape 13 accommodated within the case 11. Upon completion of this fast forwarding mode operation, as indicated in FIG. 4A, the light from the lamp 34 passes through the leader tape 20 and the window 32 and is received by the photocell 35. The fast forwarding mode of operation is thus stopped. The length of the leader tape 20 is, for example, such that the leader tape 20 cuts across the path of the light from the lamp 34 to the photocell 35, but it does not reach a position which cuts across the path of the light from the lamp 34 to the photocell 36.

The rewinding of the magnetic tape 13 is also carried out with the tape accommodated within the case 11. As shown in FIG. 4B, upon completion of the rewinding operation, the transparent leader tape 22 is paid out into the tape travel path between the reel hub 21 and the guide pole 25. As a consequence, the light from the lamp 34 reaches the photocell 36. Until now the light has been blocked by the opaque magnetic tape 13. The light transmission path passes through the leader tape 22, the openings 30, 31, and 46, and the window 33. This reception of the light by the photocell 36 signals a detection of the end of the tape, when it has completed its rewinding. The resulting output detection signal of the photocell 36 stops the rewinding operation. The length of the leader tape 22 is, for example, such that the leader tape 22 cuts across the path of the light from the lamp 34 to the photocell 36, but not across the light path of the lamp 34 to the photocell 35. In FIGS. 4A and 4B, parts of the magnetic tape 13 and the leader tapes 20 and 22 are shown twisted, but only for explanation purpose.

The light-emitting means may use an arrangement wherein light-emitting elements (such as a pair of photodiodes) have light emitting surfaces facing the photocells 35 and 36. These two elements are located at the position of the lamp 34 and are used instead of a single lamp.

In each of the above described embodiments of the invention, the light-emitting elements are not limited to lamps but may take other forms that emit light. Furthermore, the light-receiving elements are not limited to photocells, but may be other elements which receive and convert light into electric signals.

The tape-end detection signal can be used not only as a signal for stopping the recording and/or reproducing apparatus but also for changing the operational mode thereof, such as from the recording or reproducing mode to the rewinding mode or from the rewinding mode to the recording or reproducing mode.

Further, this invention is not limited to these embodiments thereof. Variations and modifications may be made without departing from the scope and spirit of the invention.

What is claimed is:

1. A magnetic tape cassette for use in a magnetic recording and/or reproducing apparatus, said cassette comprising:
case means having spaced parallel side walls, a front face, a back wall, and upper and lower panels;
first and second reel means respectively having first and second hubs, said first and second reel means being accommodated in a side-by-side relationship within said case means and between the side walls;

an opaque magnetic tape extending along a tape travel path between the first and second reel means, and having first and second transparent leaders connected from the opposite ends of said opaque tape to the first and second hubs, respectively, to be wound around the first and second reel means;

lid means for covering a part of the magnetic tape on the front face of said case means and for covering the front end portions of the side walls in the vicinity of the front face of said case means;

hinge means mounted respectively on the front end portions of the side walls for enabling said lid means to swing between closed and opened positions to cover or expose the front end portions of the side walls and to cover or expose the part of the magnetic tape on the front face;

means forming a light inlet hole in the lower panel of said case means at a position near the front face and substantially intermediate the first and second reel means; and first and second window means forming outlets of light paths extending from said light inlet hole across the tape travel path to said first and second outlet window means, said first and second window means being formed in the front portions of the side walls at positions near said hinge means, and said first and second window means being exposed or covered by said lid means when said lid means is in its opened and closed positions respectively.

2. A magnetic tape cassette as claimed in claim 1 in which said light inlet hole is positioned so that straight lines passing through the centers of the first and second window means to said light inlet hole do not intersect said first and second hubs.

3. A magnetic tape cassette as claimed in claim 1 and a hollow cylindrical wall, the light inlet hole formed in the lower panel of the case means being encompassed by said hollow cylindrical wall extending upwardly from the rim of the hole in the lower panel and into the interior of the case means, the cylindrical wall having first and second openings forming light inlets for directing light along first and second straight lines extending from the interior space within said cylindrical wall to the first and second window means respectively.

4. A magnetic tape cassette as claimed in claim 3 in which the lengths of the leaders are such that said first leader reaches a position which cuts across said first straight line but does not reach a position which cuts across said second straight line, and the second leader reaches a position which cuts across said second straight line but does not reach a position which cuts across said first straight line.

5. A magnetic tape cassette as claimed in claim 1 in which the case means has two recessed parts formed in positions which are near each other and extend from the lower panel to the front face of the case means to enable the magnetic tape to be drawn through said recessed parts and out of the case means when said lid means is in the opened position.

6. A magnetic tape cassette as claimed in claim 1 in which said lid means comprises a main lid part which covers the front face of the case means when said lid means is in said closed position, said lid means further comprising opposed side parts angularly formed integrally with the main lid part at the opposite ends thereof, said opposed side parts covering the front end portions of the side walls of the case means to shut off the first and second window means when the lid means is in said closed position.

7. A magnetic tape cassettes as claimed in claim 1 further comprising means for guiding the magnetic tape with the attached leaders along a tape travel path which passes said first and second window means so that the magnetic tape is exposed through said first and second window means when said lid means is in the opened position and is shut off from said first and second window means when said lid means is in the closed position.

8. A device for detecting the ends of a tape in a tape cassette, said tape cassette comprising a first reel having a first hub and a second reel having a second hub, an opaque tape having first and second transparent leaders integrally fixed to the opposite ends thereof, said tape being connected at the opposite ends of said leaders to said first and second hubs, cassette case means for receiving and accommodating said first and second reels, said case having a front face terminated at opposite ends by spaced side walls respectively having first and second windows formed therein, a part of said tape being exposed through the first and second windows on the opposite side walls thereof, and lid means hinged on said cassette to swing between a closed position where said lid means covers said front face and said first and second windows and an opened position where said lid means exposes said front face and said first and second windows; detector means within the cassette case comprising one light-emitting means, first and second light-receiving means respectively disposed opposite said light-emitting means and said first and second windows when said lid means is in the opened position, means comprising said first light-receiving means for detecting one end of the tape in response to light passing through said first leader and said first window when said lid means is in the opened position, and means comprising said second light-receiving means for detecting the other end of the tape in response to light passing through said second leader and said second window when said lid means is in the opened position.

* * * * *